(12) United States Patent
Jonasson et al.

(10) Patent No.: US 11,292,520 B2
(45) Date of Patent: Apr. 5, 2022

(54) METHOD AND SYSTEM FOR PROVIDING AN INTERVENING STEERING ACTION FOR A HOST VEHICLE TO AVOID A COLLISION

(71) Applicant: Volvo Car Corporation, Gothenburg (SE)

(72) Inventors: Mats Jonasson, Partille (SE); Derong Yang, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 218 days.

(21) Appl. No.: 16/451,050

(22) Filed: Jun. 25, 2019

(65) Prior Publication Data

US 2020/0023900 A1 Jan. 23, 2020

(30) Foreign Application Priority Data

Jul. 19, 2018 (EP) ...................................... 8184368

(51) Int. Cl.
*B62D 15/02* (2006.01)
*B62D 6/00* (2006.01)

(52) U.S. Cl.
CPC ......... *B62D 15/0265* (2013.01); *B62D 6/003* (2013.01)

(58) Field of Classification Search
CPC ............................ B62D 15/0265; B62D 6/003
See application file for complete search history.

(56) References Cited

U.S. PATENT DOCUMENTS

| 2008/0255729 | A1* | 10/2008 | Ichinose | B62D 15/025 |
| | | | | 701/42 |
| 2014/0032049 | A1* | 1/2014 | Moshchuk | G08G 1/166 |
| | | | | 701/42 |
| 2015/0266474 | A1* | 9/2015 | Gustafsson | B60W 30/02 |
| | | | | 701/41 |

(Continued)

FOREIGN PATENT DOCUMENTS

| DE | 2013216931 A1 | 2/2015 |
| DE | 2014202387 A1 | 8/2015 |

(Continued)

OTHER PUBLICATIONS

Feb. 7, 2019 European Search Report issue on International Application No. EP18184368.

*Primary Examiner* — Aniss Chad
*Assistant Examiner* — Madison R Hughes
(74) *Attorney, Agent, or Firm* — Clements Bernard Walker; Christopher L. Bernard

(57) ABSTRACT

A method for providing an intervening action for a host vehicle. A target is detected in the vicinity of the vehicle it is determined that the host vehicle is travelling on a collision course with the target. When a collision with the target is predicted to occur within a predetermined time period and no driver initiated steering action for avoiding the collision course has been detected, controlling a steering control system to provide an initial steering torque action to the steerable wheels of the host vehicle for providing an initial steering action towards the same side of the target as a detected safe side. A driver initiated steering action is in response to the initial steering torque action is detected. Next, the intervening action is provided for altering the present driving course of the host vehicle for avoiding a collision with the target.

9 Claims, 4 Drawing Sheets

(56) References Cited

U.S. PATENT DOCUMENTS

| | | | | |
|---|---|---|---|---|
| 2015/0329142 A1* | 11/2015 | Takeda | ................... | B62D 5/04 |
| | | | | 701/41 |
| 2017/0334483 A1 | 11/2017 | Schiebahn et al. | | |
| 2019/0217854 A1* | 7/2019 | Park | ................... | B60W 30/045 |

FOREIGN PATENT DOCUMENTS

| | | | |
|---|---|---|---|
| EP | 1982898 A2 | 10/2008 | |
| EP | 3095659 A1 | 11/2016 | |

* cited by examiner

# METHOD AND SYSTEM FOR PROVIDING AN INTERVENING STEERING ACTION FOR A HOST VEHICLE TO AVOID A COLLISION

CROSS-REFERENCE TO RELATED APPLICATION

The present disclosure claims the benefit of priority of co-pending European Patent Application No. 18184368.1, filed on Jul. 19, 2018, and entitled "METHOD AND SYSTEM FOR PROVIDING AN INTERVENING STEERING ACTION FOR A HOST VEHICLE TO AVOID A COLLISION," the contents of which are incorporated in full by reference herein.

TECHNICAL FIELD

The present disclosure relates to a method for providing an intervening steering action for a host vehicle for avoiding a collision with a target, and to a corresponding evasive steering system.

BACKGROUND

Todays vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle.

More advanced cruise control systems are able to dynamically adapt the speed of the vehicle, for example slowing down for lead vehicles. Furthermore, some advanced driver assist systems are able to autobrake the vehicle under some circumstances if a collision is predicted.

EP3095659 discloses a system able to provide an evasive maneuver if a threat of a collision is present. The system disclosed in EP3095659 is adapted to apply a steering torque to the vehicle wheels in order to avoid a collision with an object. The steering torque is applied in response to a driver initiated maneuver to avoid the collision. According to EP3095659, the driver firstly initiates a steering maneuver towards a drivable zone, whereby the system is adapted to maintain the vehicle on that path in the drivable zone.

EP3095659 provides a promising solution to providing evasive maneuvers. However, in some cases the driver does not respond to a threat of a collision in such a way that the system disclosed in EP3095659 is immediately triggered. There is therefore room for improvement with regards to providing evasive maneuvers for vehicles presented with a threat of collision.

SUMMARY

In view of above-mentioned prior art, it is an object of the present disclosure to provide an improved method for providing intervening actions for a host vehicle for avoiding a collision with a target.

According to a first aspect of the disclosure, there is provided a method for providing an intervening action for a host vehicle for avoiding a collision with a target, the method includes: detecting a target in the vicinity of the vehicle; determining that the host vehicle is travelling on a collision course with the target; when a collision with the target is predicted to occur within a predetermined time period and no driver initiated steering action for avoiding the collision course has been detected, controlling a steering control system to provide an initial steering torque action to the steerable wheels of the host vehicle, the initial steering torque action provides an initial steering action towards the same side of the target as a detected safe side of the target; detecting a driver initiated steering action in response to the initial steering torque action, and providing the intervening action for altering the present driving course of the host vehicle for avoiding a collision with the target.

The present disclosure is based on the realization that in many accident situations the driver doesn't attempt to steer away from target threat. This is particularly prominent during rear-end collisions where driver tend to use only braking in their attempts to avoid a collision. It was therefore realized that the driver needs an indication that a steering action is needed.

The initial steering torque action provides a subtle steering indication for the driver in order to influence the driver to provide a driver initiated steering action. Thus, instead of braking only, the driver will then realize, or be reminded of that a steering action is needed and may at least subconsciously realize to steer away from the target. Thereby, the intervening action may be triggered by the detected driver initiated steering action.

Accordingly, with the inventive concept, the probability of avoiding a collision increases and therefore also provides improved safety for occupants of the host vehicle.

The vicinity of the vehicle may generally be understood to be ahead of or in front of the host vehicle. In other words, the collision course may be understood to lead to a rear-end collision with the target if no action is taken.

The detected safe side of the target may be detected by detection systems on the vehicle which may detect the presence of other objects or pedestrians, but may also detect lane markings of additional lanes on the side of the target. Accordingly, firstly a safe side of the target may be detected by concluding that no obstacles is present on one side of the target, and then the initial steering torque action provides an initial steering action towards the detected safe side, i.e. to the left or to the right of the target.

Detecting a driver initiated steering action in response to the applied initial steering torque may include detecting a driver initiated turn of the steerable wheels of the vehicle, or a driver initiated turning of the steering wheel, or detecting an altered steering wheel angular speed, or detecting a torsion bar torque in the steering mechanism, to mention some examples.

The initial steering torque may provide both for providing a steering indication for the driver, and to prepare the steering system for a subsequent steering action.

According to embodiments of the disclosure, the initial steering torque action may provide a directional indication for the driver to provide the driver initiated steering action as an enhancement to the initial steering torque action. The initial steering torque action is applied in a "smooth" manner such that the driver does not attempt to counteract the initial steering torque action.

According to embodiments of the disclosure, the initial steering torque action provides a preparatory steering torque amplitude for preparing the steering system of the host vehicle to respond faster to the subsequent driver initiated steering action. The preparatory steering torque amplitude is adapted to "pre-tension" the steering system such that a faster response time is possible when the driver provides the driver initiated steering action. The pre-tensioning includes to apply a low amplitude steering torque using e.g. an electrically powered steering assist system in order to enable a faster steering response for the driver initiated steering action. The low amplitude steering torque should be sufficient to at least compensate for internal friction in the steering system.

For instance, the initial steering torque action may be adapted to provide a steering torque with amplitude sufficient to initiate a lateral drift of the host vehicle. The lateral drift is in the direction towards the safe side and is slow enough for the driver not to over-react and steer against the drift direction. The steering torque amplitude is below a predetermined threshold amplitude, and the predetermined threshold amplitude may depend on the speed of the host vehicle. A higher speed results in a lower threshold amplitude. The steering torque amplitude is chosen so that a desired vehicle yaw angle is obtained.

According to embodiments of the disclosure, the initial steering torque action may provide a wheel angle for a predetermined time duration such that the resulting yaw angle is below a predetermined yaw angle threshold. The wheel angle is the angle between a neutral straight pointing direction of the wheels and the pointing direction when the wheels are turned. The resulting yaw angle depends on the host vehicle speed, the wheel angle, and the road geometry. For instance, the inclination of the road may affect the resulting yaw angle. Furthermore, the longer time duration that a specified wheel angle is used, the larger the yaw angle. Thus, the resulting yaw angle is a trade-off between the wheel angle and the time duration for a given host vehicle speed.

The yaw angle threshold may be lower than the yaw angle required for avoiding a collision with the target. In line with the above, the initial steering torque action is not on its own sufficient to avoid a collision with the target but is meant as an indication for the driver to steer away and avoid the collision course.

The yaw angle threshold may be about 5 degrees or less.

In embodiments of the disclosure, a stability parameter value may be determined indicative of the driving stability of the vehicle, wherein the intervening action is only provided when the stability parameter value indicates that the host vehicle is stable. The stability parameter may indicate a tire slip angle below a threshold value, preferably in the linear regime, i.e. that the vehicle is not "skidding". The slip angle is the angle between the travel direction of the tire contact patch and the wheel hub direction (i.e. the pointing direction of the wheel).

In embodiments of the disclosure the intervening action may be based on enhancing the driver initiated steering action such that the altered present driving course includes a curvature sufficient to avoid a collision with the target.

According to a second aspect of the disclosure, there is provided an evasive steering system configured to provide an intervening action for a host vehicle for avoiding a collision with a target, the system includes: a driving environment detection unit configured to detect a target in the vicinity of the host vehicle; a collision determining unit configured to determine that the host vehicle is on collision course with the target; a steering control system configured to control a steering torque of the host vehicle; and a vehicle control unit configured to: predict that a collision with the target is predicted to occur within a predetermined time period; determine that no driver initiated steering action for avoiding the collision course has been detected; control a steering control system to provide an initial steering torque action to the steerable wheels of the host vehicle; detect a driver initiated steering action in response to the initial steering torque action; provide an intervening action signal to the steering control system to control the present driving course of the host vehicle for avoiding a collision with the target.

According to embodiments, the system may include a vehicle stability measuring unit configured to determine a stability parameter value indicative of the driving stability of the vehicle, wherein the vehicle control unit is configured to provide the intervening action signal only when the stability parameter value indicates that the host vehicle is stable. The vehicle stability measuring unit may be configured to determine a slip angle of the tires of the host vehicle.

According to embodiments, the system may include: a yaw angle monitoring unit configured to monitor the present yaw angle of the host vehicle, wherein the initial steering torque action provides a wheel angle for a predetermined time duration such that the resulting yaw angle is below a predetermined yaw angle threshold.

The intervening action may include to enhance the driver initiated steering action such that the altered present driving course includes a curvature sufficient to avoid a collision with the target.

A control unit may include at least one microprocessor, microcontroller, programmable digital signal processor or another programmable device.

Effects and features of the second aspect of the disclosure are largely analogous to those described above in connection with the first aspect of the disclosure.

There is further provided a vehicle including the evasive steering system according to any one of the embodiments.

In summary, the present disclosure relates to a method for providing an intervening action for a host vehicle. A target is detected in the vicinity of the vehicle it is determined that the host vehicle is travelling on a collision course with the target. When a collision with the target is predicted to occur within a predetermined time period and no driver initiated steering action for avoiding the collision course has been detected, controlling a steering control system to provide an initial steering torque action to the steerable wheels of the host vehicle for providing an initial steering action towards the same side of the target as a detected safe side. A driver initiated steering action is in response to the initial steering torque action is detected. Next, the intervening action is provided for altering the present driving course of the host vehicle for avoiding a collision with the target.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein.

DESCRIPTION OF EMBODIMENTS

Figure 1:
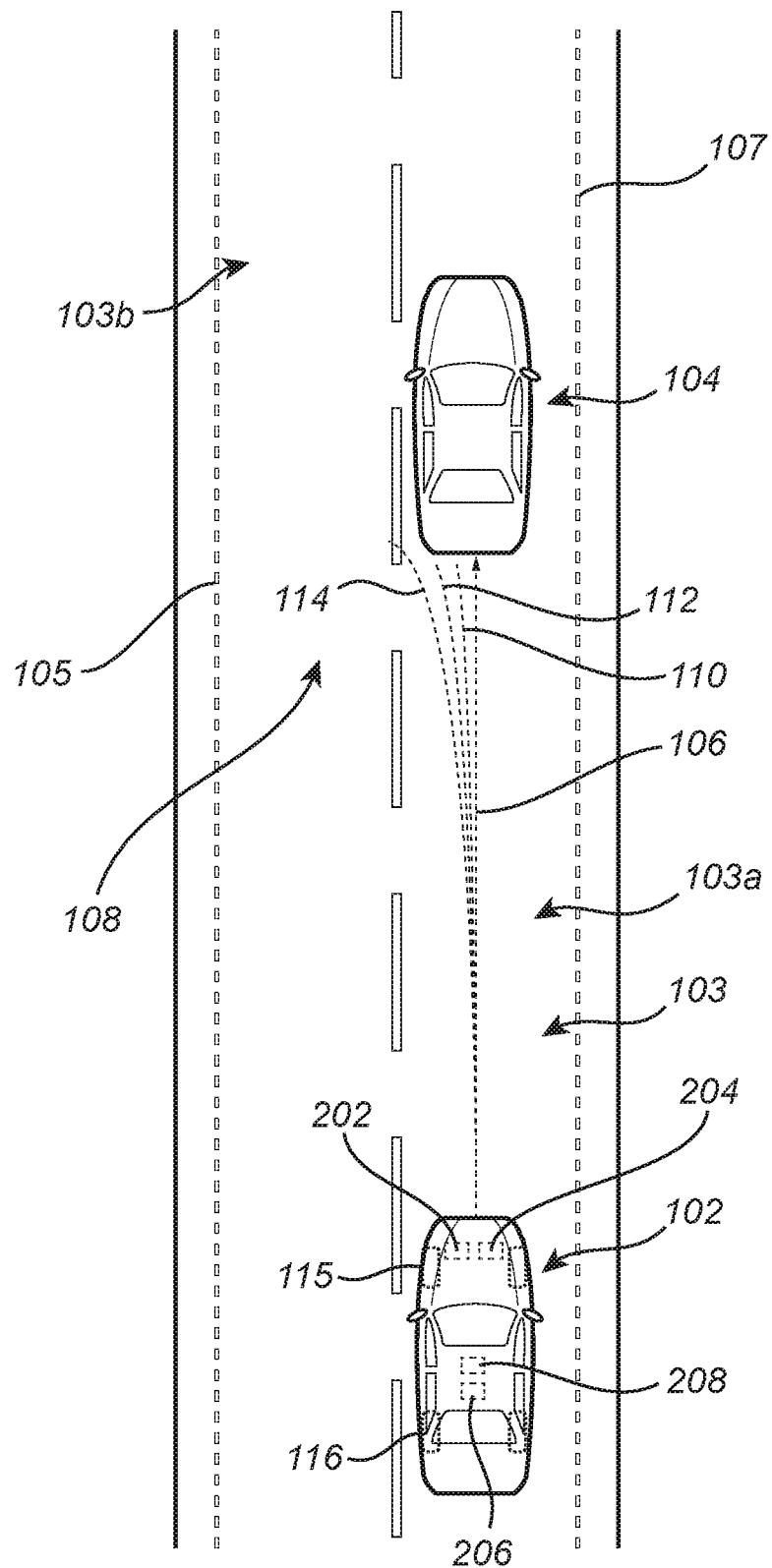
FIG. 1 illustrates a schematic overview of exemplifying an evasive steering system according to embodiments of the disclosure.

In the present detailed description, various embodiments of the system and method according to the present disclosure are described. However, this disclosure may be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1 illustrates a schematic overview of exemplifying an evasive steering system according to embodiments of the disclosure. The evasive steering system is included in a host vehicle 102 here shown travelling on a road 103. The road is delimited by outer edges 105 and 107, which may be lane markers. The road is here shown to have two lanes, the lane 103a on which the target 104 and the host vehicle 102 are travelling and an opposing lane 103b. The target is here a target vehicle 104.

The host vehicle 102 includes a driving environment detection unit 202 configured to detect the target 104 in the vicinity of the host vehicle 102. Furthermore, the host vehicle 102 includes a collision determining unit 204 configure to determine that the host vehicle is on collision course with the target, and a steering control system 206 configured to control a steering torque of the host vehicle. A vehicle control unit 208 of the host vehicle 102 is configured to execute a number of steps leading to an intervening action signal to the steering control system 206 to control the present driving course of the host vehicle for avoiding a collision with the target, as will be described below.

The host vehicle 102 approaches the target 104 from a rear side of the target 104. Here, the target is exemplified as a car for illustrative purposes. The target is however not limited to being a car but may be any vehicle or object which the host vehicle 102 may be on collision course with.

In the presently described situation, the host vehicle 102 is on collision course 106 with the target 104. The target 104 may be detected by a driving environment detection unit 202 which may include a Lidar, a radar, a camera, ultrasound sensors, or any other suitable sensor that may detect objects in the vicinity of the host vehicle 102.

The collision determining unit 204 may use the information about the detected target, such as the location of the target 104 relative the host vehicle 102, and the present driving course of the host vehicle to determine that the host vehicle 102 is on collision course 106 with the target 104.

As shown in FIG. 1, if the host vehicle continues its present course 106, the risk of colliding with the target 104 is imminent.

The vehicle control unit 208 is configured to take action when a predicted time duration to a collision for the host vehicle 102 with the target 104 is below a threshold time, and no driver initiated steering action has been detected. In other words, the vehicle control unit 208 is configured to take action if a collision will occur within the predetermined time duration under the present speed and course 106. The predetermined time duration may be in the order of seconds, e.g. 1, 2, 3, 4, or 5 seconds.

Accordingly, when a collision with the target 104 is predicted to occur within a predetermined time period and no driver initiated steering action for avoiding the collision course 106 has been detected, the steering control system 206 is controlled by the vehicle control unit 208 to provide an initial steering torque action. The initial steering torque action provides a slow lateral drift towards one side of the target vehicle 104, sufficient to provide the driver of the host vehicle 102 with an indication that a steering action is required. The initial steering torque action thus results in a slightly adjusted course 110 for the host vehicle 102.

The initial steering torque action will pre-tension the steering system of the host vehicle 102 such that the steering control system of the host vehicle will respond faster to the subsequent driver initiated steering action. Preparatory steering torque amplitude is thus applied to overcome internal friction to prepare the steering system for a subsequent steering action.

Furthermore, the initial steering torque action may also be based on setting a wheel angle of the steerable wheels for a predetermined time duration such that the resulting yaw angle is below a predetermined yaw angle threshold, such as 5 degrees. The resulting yaw angle depends on the wheel angle in combination with the time duration that the wheel angle is maintained.

The adjusted course 110 is directed towards one side of the target 104, in this exemplary situation the adjusted course 110 is directed towards the left side of the target 104. The adjusted course 110 caused by the initial steering torque action is directed towards the side of the target which is considered a safe side. For this, the safe side 108 is detected by concluding that no obstacle is present on that side.

The detected safe side of the target may be detected by detection systems such as the driving environment detection unit 202 of the vehicle which may detect the presence of other objects or pedestrians, but may also detect lane markings of additional lanes on the side of the target. Accordingly, firstly a safe side of the target may be detected, and then the initial steering torque action provides an initial steering action towards the detected safe side, i.e. to the left or to the right of the target 104.

The steering control system 206 providing the initial steering torque action may include an electrically powered assisted steering system. Thus, the vehicle control unit 208 may request a steering torque, i.e. an initial steering torque action to the electrically powered assisted steering system. The requested steering torque ($T_{req}$) may be given by:

$$T_{req} = K_{ff} * C_{req} + K_{fb} * (C_{req} - C)$$

where $K_{ff}$ is a feedforward gain based on a linear reversed vehicle model, $K_{fb}$ is a feedback gain and is a tunable constant, $C_{req}$ is the required curvature to avoid collision, and C is the present curvature. The sign of $T_{req}$ provides an indication of whether a left or right hand curvature is requested. However, the requested $T_{req}$ should be limited to not provide a yaw angle larger than the threshold yaw angle, and it should also be below a threshold amplitude so that the driver does not attempt to intuitively counteract the initial steering torque action. With the initial steering torque action, the host vehicle will drift laterally in the intended direction.

The initial steering torque action thus provides a subtle indication to the driver who in response provides a driver initiated steering action which may be detected by the vehicle control unit 208 based on e.g. a received signal from the steering system 206 of the host vehicle 102. Preferably, the driver initiated steering action turns the vehicle towards the same side as the initial steering torque action, thereby providing a slightly enhanced curved course 112.

When the driver initiated steering action is detected, an intervening action signal may be provided by the vehicle control unit 208 to the steering control system 206 such that the present course, i.e. the course 112 caused by the driver initiated steering action, is further altered for avoiding a collision with the target 104. The further altered course is here the course 114. Accordingly, the intervening action is based on enhancing the driver initiated steering action such that the altered present driving course 114 includes a curvature sufficient to avoid a collision with the target 104.

The intervening action may for example include to apply a steering torque to the steerable wheels and/or to brake with the inner wheels 115, 116 in the curved altered course 114 to in this way enhance the course 112.

Figure 2:
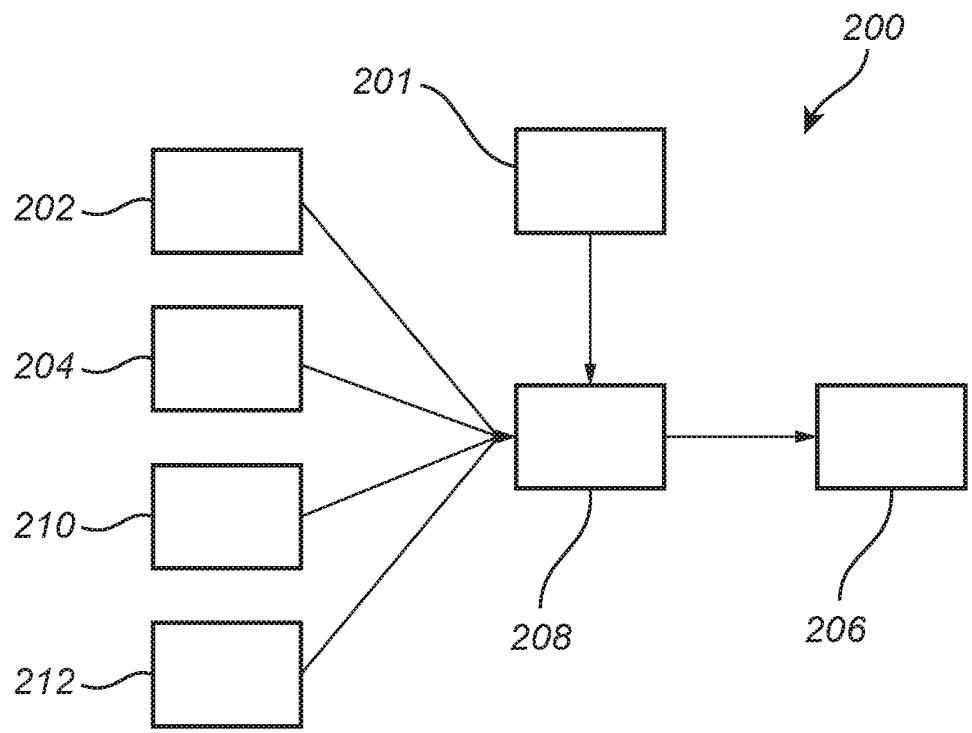
FIG. 2 is a box diagram of an evasive steering system 200 according to embodiments of the disclosure.

FIG. 2 is a box diagram of an evasive steering system 200 according to embodiments of the disclosure. The evasive steering system 200 includes a driving environment detection unit 202 configured to detect a target in the vicinity of the host vehicle. The driving environment detection unit 202 may include a Lidar, radar, a camera, ultrasound sensors, or any other suitable sensor that may detect objects in the vicinity of the host vehicle. The driving environment detection unit 202 may provide a signal indicative of detected objects to a vehicle control unit 208.

In addition, the evasive steering system 200 may optionally include vehicle to vehicle communication units, and/or vehicle to infrastructure communication units, and/or vehicle to device communication units, i.e. communication units 201 generally known as V2X communication with the "cloud" via a server in order to gain information of the presence of other vehicles or objects.

Moreover, the system 200 includes a collision determining unit 204 configure to determine that the host vehicle is on collision course with the target. The collision determining unit 204 may include a processor or control unit, for example part of the vehicle control unit 208 or part of a another safety system of the vehicle used for predicting collision. The collision determining unit 204 may provide a signal to the vehicle control unit that the host vehicle is on collision course with a target.

A steering control system 206 included in the system 200 is configured to control the curvature of the host vehicle, by applying a steering torque overlay. The steering toque is used for turning the steerable wheels of the vehicle to a desirable wheel angle which corresponds to the desired curvature. The steering control system 206 is controlled by the vehicle control unit 208.

The steering control system 206 may include a controller which calculates the required steering angle in order to follow a desired curvature, using e.g. a vehicle model, a controller which calculates the required steering torque overlay to follow the calculated required steering angle using a steering system model. In addition, the steering control system 206 may include an electric machine to provide the steering torque.

In some embodiments, the evasive steering system 200 includes a vehicle stability measuring unit 210 configured to determine a stability parameter value indicative of the driving stability of the vehicle. The vehicle control unit 208 is configured to provide the intervening action only when the host vehicle is determined to be stable.

Figure 3:
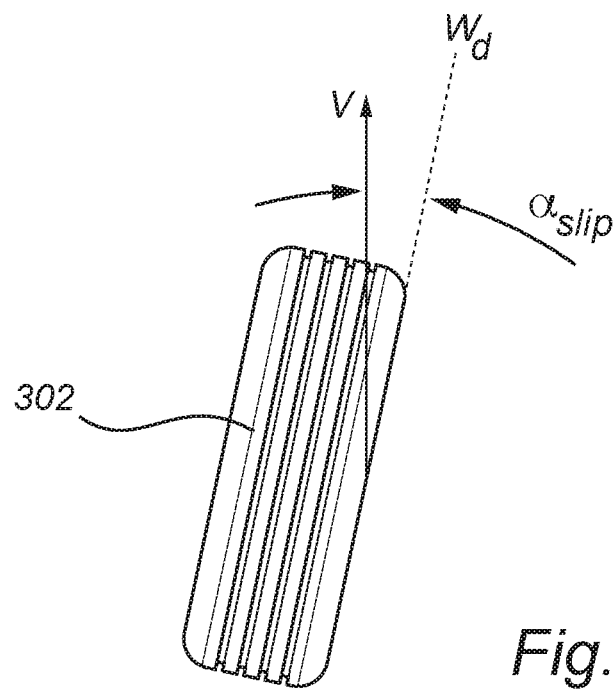
FIG. 3 schematically illustrates a slip angle.

The stability parameter may be indicative of a slip angle for at least one wheel of the host vehicle. FIG. 3 schematically illustrates a top view of a vehicle tire 302. The slip angle ($\alpha_{slip}$) is defined as the angle between the travel direction v of the tire contact patch and the wheel hub direction $W_d$ (i.e. the pointing direction of the wheel). For example, it is desirable that the host vehicle is not under a skidding event when the intervening action is initiated.

Figure 4:
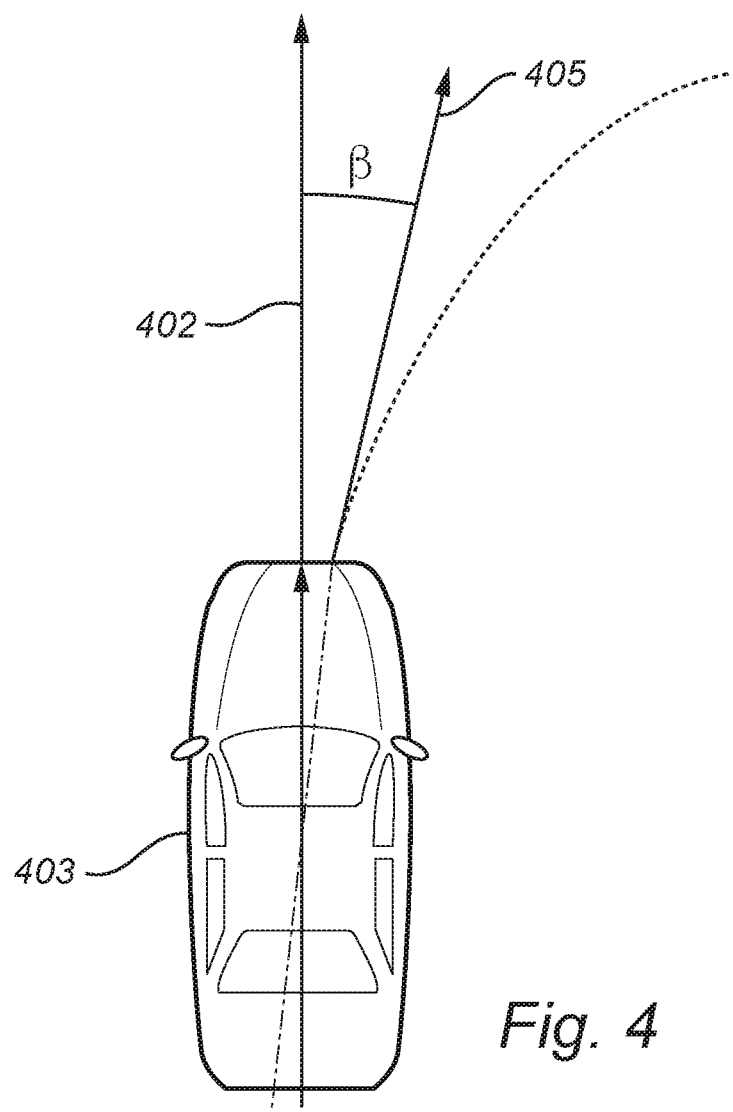
FIG. 4 schematically illustrates a yaw angle.

In some embodiments, the evasive steering system 200 includes a yaw angle monitoring unit 212 configured to monitor the present yaw angle of the host vehicle. Thereby, it can be ensured that the initial steering torque action provides a wheel angle for a time duration sufficient to maintain the resulting yaw angle for the vehicle below a yaw angle threshold. Generally, and as is schematically illustrated in FIG. 4, the yaw angle β is the angle between the initial travelling direction 402 for the vehicle 403 and the present pointing direction 405 of the vehicle.

Figure 5:
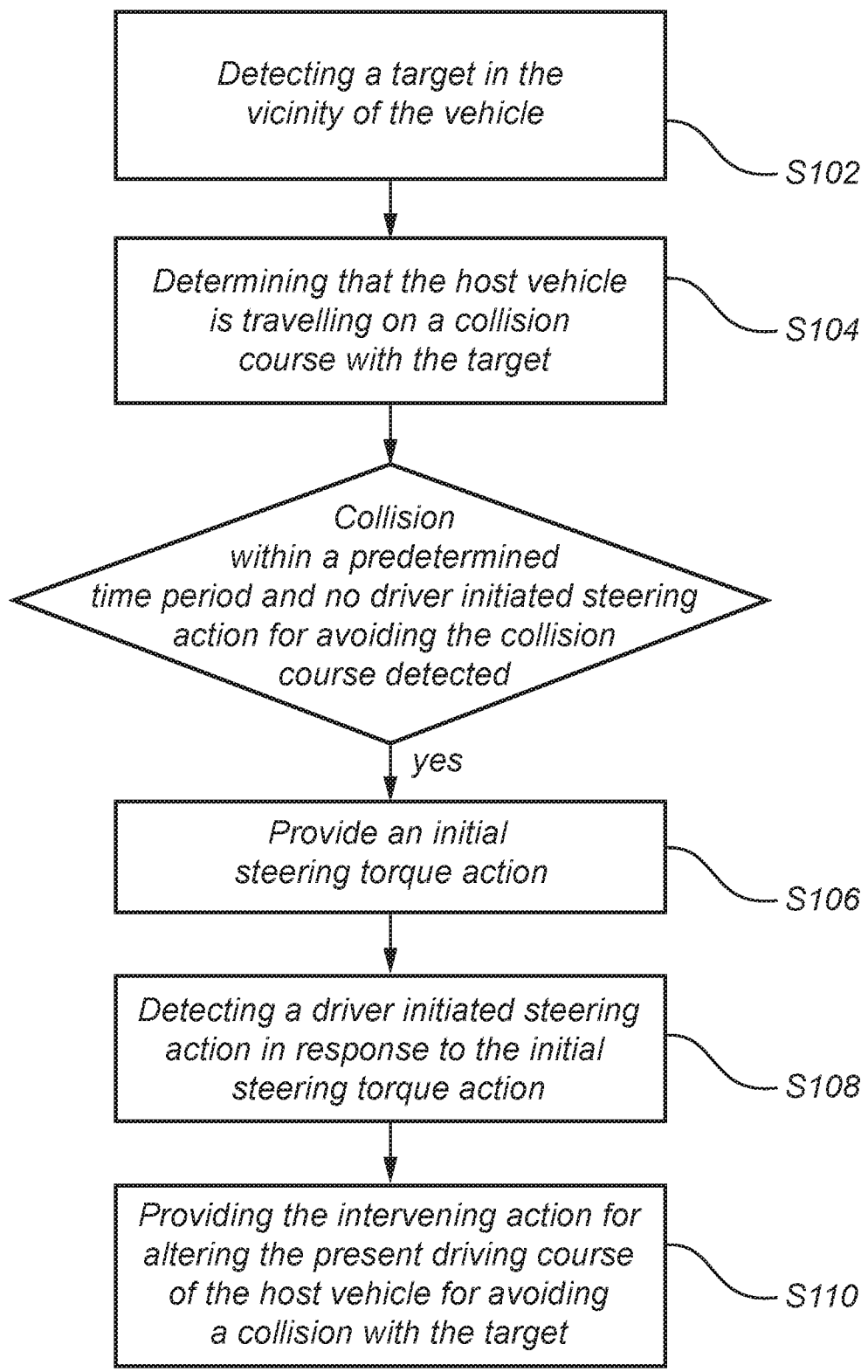
FIG. 5 is a flow-chart of method steps according to embodiments of the disclosure.

FIG. 5 is a flow-chart of method steps according to embodiments of the disclosure. In step S102, a target is detected in the vicinity of the vehicle. In subsequent step S104 it is determined that the host vehicle is travelling on a collision course with the target. Next, it may be concluded that a collision with the target is predicted to occur within a predetermined time period and that no driver initiated steering action for avoiding the collision course has been detected. In such case a steering control system may be controlled in step S106 to provide an initial steering torque action to the steerable wheels of the host vehicle. The initial steering torque action provides an initial steering action towards the same side of the target as a detected safe side of the target. A driver initiated steering action in response to the initial steering torque action may be detected in step S108. Finally, the intervening action may be provided in step S110 for altering the present driving course of the host vehicle for avoiding a collision with the target.

A vehicle (host or target) in accordance with the disclosure may be any vehicle operative on a road, such as a car, a truck, a lorry, a bus, etc.

The vehicle control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for assisting a host vehicle in avoiding a collision with a target, the method comprising:
    detecting the target in the vicinity of the vehicle;
    determining that the host vehicle is travelling on a collision course with the target;
    when a collision with the target is predicted to occur within a predetermined time period and no driver initiated steering action for avoiding the collision course has been detected, controlling a steering control system to provide an initial steering torque action adapted to provide a steering torque to initiate lateral drift of the host vehicle to the steerable wheels of the host vehicle, the initial steering torque action providing an initial steering action towards the same side of the target as a detected safe side of the target and to influence a driver to provide the driver initiated steering action by providing a wheel angle for a predetermined time duration such that a resulting yaw angle of the vehicle is no more than 5 degrees;
    detecting the driver initiated steering action in response to the initial steering torque action;
    determining a stability parameter value indicative of the driving stability of the vehicle; and
    only when the stability parameter value indicates that the host vehicle is stable and triggered by the detected driver initiated steering action, providing an intervening action comprising applying a steering torque for altering the present driving course of the host vehicle for avoiding a collision with the target, wherein the applied steering torque has a higher amplitude than the steering torque of the initial steering torque action.

2. The method of claim 1, wherein the initial steering torque action provides a directional indication for the driver to provide the driver initiated steering action as an enhancement to the initial steering torque action.

3. The method of claim 1, wherein the initial steering torque action provides a preparatory steering torque amplitude for preparing the steering control system of the host vehicle to respond faster to the subsequent driver initiated steering action.

4. The method of claim 1, wherein the initial steering torque action provides a steering torque with an amplitude sufficient to initiate a lateral drift of the host vehicle.

5. The method of claim 1, wherein the yaw angle threshold is lower than a yaw angle required for avoiding a collision with the target.

6. The method of claim 1, wherein the intervening action is based on enhancing the driver initiated steering action such that the altered present driving course comprises a curvature sufficient to avoid a collision with the target.

7. An evasive steering system configured to provide an intervening action for a host vehicle for avoiding a collision with a target, the evasive steering system comprising:
    a driving environment detection unit configured to detect the target in the vicinity of the host vehicle;
    a collision determining unit configured to determine that the host vehicle is on collision course with the target;
    a steering control system configured to control a steering torque of the host vehicle;
    a vehicle stability measuring unit configured to determine a stability parameter value indicative of the driving stability of the vehicle;
    a yaw angle monitoring unit configured to monitor a yaw angle of the host vehicle; and
    a vehicle control unit configured to:
        predict that a collision with the target is predicted to occur within a predetermined time period;
        determine that no driver initiated steering action for avoiding the collision course has been detected;
        control the steering control system to provide an initial steering torque action adapted to provide a steering torque to initiate lateral drift of the host vehicle to the steerable wheels of the host vehicle towards a same side of the target as a detected safe side of the target and to influence a driver to provide the driver initiated steering action by providing a wheel angle for a predetermined time duration such that the resulting yaw angle is no more than 5 degrees;
        detect the driver initiated steering action in response to the initial steering torque action; and
        only when the stability parameter value indicates that the host vehicle is stable and triggered by the detected driver initiated steering action, provide an intervening action comprising applying a steering torque for altering the present driving course of the host vehicle for avoiding a collision with the target, wherein the applied steering torque has a higher amplitude than the steering torque of the initial steering torque action.

8. The evasive steering system of claim 7, wherein the intervening action comprises to enhance the driver initiated steering action such that the altered present driving course comprises a curvature sufficient to avoid a collision with the target.

9. A vehicle including the evasive steering system of claim 7.

* * * * *